United States Patent
Kittaka et al.

Patent Number: 5,221,391
Date of Patent: Jun. 22, 1993

[54] PROCESS FOR PRODUCING A PREFORM FOR FORMING FIBER REINFORCED PLASTICS

[75] Inventors: Hirokazu Kittaka; Akihiko Nishizaki; Toshihiro Ichijo, all of Sagamihara, Japan

[73] Assignee: Nitto Boseki Co., Ltd., Fukushima, Japan

[21] Appl. No.: 478,967

[22] Filed: Feb. 9, 1990

[30] Foreign Application Priority Data

Feb. 9, 1989 [JP] Japan .................................. 1-030440

[51] Int. Cl.⁵ .................... B32B 31/20; B65H 81/00
[52] U.S. Cl. .................................. 156/171; 156/173; 156/309.6; 264/258
[58] Field of Search ............... 156/171, 172, 173, 175, 156/161, 162, 184, 187, 195, 446, 74, 309.6; 264/134, 135, 136, 137, 257, 258

[56] References Cited

U.S. PATENT DOCUMENTS

| | | | |
|---|---|---|---|
| 3,736,202 | 5/1973 | Sorenson | 156/309.6 |
| 4,010,054 | 3/1977 | Bradt | 156/173 |
| 4,098,943 | 7/1978 | Degginger et al. | 156/324 |
| 4,109,543 | 8/1978 | Foti | 156/137 |
| 4,380,523 | 4/1983 | Lind et al. | 156/173 |
| 4,445,951 | 5/1984 | Lind et al. | 156/93 |
| 4,590,027 | 5/1986 | Murphy et al. | 264/135 |
| 4,613,473 | 9/1986 | Layden et al. | 264/103 |
| 4,871,491 | 10/1989 | McMahon et al. | 264/257 |
| 4,950,439 | 8/1990 | Smith et al. | 264/294 |

FOREIGN PATENT DOCUMENTS

| | | | |
|---|---|---|---|
| 62-780 | 1/1987 | Japan . | |
| 63-152637 | 6/1988 | Japan . | |
| 2-7825 | 2/1990 | Japan . | |
| 1485586 | 9/1977 | United Kingdom | 264/258 |
| 2114055 | 8/1983 | United Kingdom | 264/136 |

*Primary Examiner*—Jay H. Woo
*Assistant Examiner*—Robert B. Davis
*Attorney, Agent, or Firm*—Wegner, Cantor, Mueller & Player

[57] ABSTRACT

A preform for forming fiber reinforced plastics which involves a reinforcing fiber layer composed of aligned continuous reinforcing fiber formed by winding and a heat-meltable fiber layer wound on the reinforcing fiber layer, the layers being piled up alternately in plural layers and in such a way that the outermost layer is constituted of the reinforcing fiber layer and the reinforcing fiber layers being melt-bonded with each other by the heat-meltable fiber to form an integral body, and to a process for producing the same. The preform is suited for use in producing plastic formed articles of high strength and high rigidity employed for frames, plate springs, and other parts of automobiles, vehicles, etc.

3 Claims, 2 Drawing Sheets

PROCESS FOR PRODUCING A PREFORM FOR FORMING FIBER REINFORCED PLASTICS

FIELD OF THE INVENTION

The present invention relates to a fiber preform material which is used in forming fiber reinforced plastics to be embedded in resin and thereby to reinforce the resin. In more particular, it relates to a novel preform formed by a filament winding process and to a process for producing the same.

BACKGROUND OF THE INVENTION

Various forms of preforms have been known heretofore, and a number of processes are also known already for forming such preforms. For example, Japanese Patent Application Kokoku (Post-Exam. Publn.) No. 62-780 discloses a preform which comprises a glass short fiber mat and a glass fiber woven fabric bonded therewith through the heat-melting ability of a heat-meltable short fiber web provided therebetween. Japanese Patent Application Kokai (Laid-open) No. 63-152637 discloses a preform which has a lamination structure of a reinforcing textile base material containing a thermoplastic polymer adhered to the warp or the weft or both, the textile base materials adjacent to each other being bonded with each other by said polymer to form an integral body; and a preform which has an alternate lamination structure of said reinforcing textile base material and another reinforcing fiber base material containing no thermoplastic polymer adhered thereto, said base material and said another base material adjacent to each other being bonded with each other by said polymer to form an integral body.

However, the former preform, namely the one disclosed by Japanese Patent Application Kokoku No. 62-780, tends to be bulky since it is formed by a combination of glass short fiber mat and glass fiber woven fabric, and hardly gives a preform for forming fiber reinforced plastics having a high strength in one direction. On the other hand the latter preforms, namely those disclosed by Japanese Patent Application Kokai No. 63-152,637, being a preform material mainly for use in resin injection molding, give a reinforcing fiber content of only about 25-35% by weight and even in the vacuum resin injection process the content is only 40-50% by weight, a higher content of reinforcing fiber leading to difficulty in molding. Also, with regard to orientation of fiber, since the preform is composed of laminated reinforcing textile base materials, a preform material for forming articles having a high strength in one direction alone cannot be obtained. Since the content of reinforcing fiber cannot be made sufficiently high in such molding processes mentioned above, there is a limit in obtaining reinforced plastic formed articles having high strength overall.

To increase the content of continuous reinforcing fiber such as glass fiber in forming fiber reinforced plastics, there is known as the filament winding method a process which comprises winding a resin-impregnated glass fiber on a core followed by heat curing. Such a method, however, gives formed articles whose shapes are inevitably determined by the shape of the core and which are limited to those from which the core can be taken away.

The present inventors, in order to form a preform in which continuous fiber is arranged in a state of tension and to obtain a fiber reinforced plastic having high strength and high rigidity in the direction of the arranged continuous fiber by using the preform, tried a method of forming a preform by winding, with simultaneous traversing, in layers a continuous fiber strand, e.g. glass fiber roving, in a state of tension round a rotating mandrel. However, forming a preform merely by winding a roving around a mandrel presents a problem in that the winding layers of the preform will be disordered at the time of detaching the preform from the mandrel after its formation or in handling the detached preform.

The object of the present invention is to provide a preform for forming fiber reinforced plastics in which the bulk density is suppressed and the fiber content is increased by so-called filament winding method and which at the same time has high strength and high rigidity in the direction of arrangement of continuous fiber and undergoes no disorder of winding layers at the time of detaching the preform from the core or in forming fiber reinforced plastics by using the preform.

SUMMARY OF THE INVENTION

According to the present invention, there is provided a novel preform for forming fiber reinforced plastics which comprises a reinforcing fiber layer composed of an aligned continuous reinforcing fiber formed by winding and a heat-meltable fiber layer wound on said reinforcing fiber layer, said layers being piled up alternately in plural layers and in such a way that the outermost layer is constituted of the reinforcing fiber layer and the reinforcing fiber layers being melt-bonded with each other by the heat-meltable fiber to form an integral body.

Said preform for forming fiber reinforced plastics is produced by winding a continuous reinforcing fiber on a core to form a reinforcing fiber layer, then winding on said layer a tape-formed heat-meltable fiber web to form a heat-meltable fiber layer, forming the reinforcing fiber layer and the heat-meltable fiber layer alternately in plural layers, forming the reinforcing fiber layer as the outermost layer, heat-melting the heat-meltable fiber and, after cooling, detaching the laminated preform from the core.

DESCRIPTION OF THE INVENTION

Figure 1:
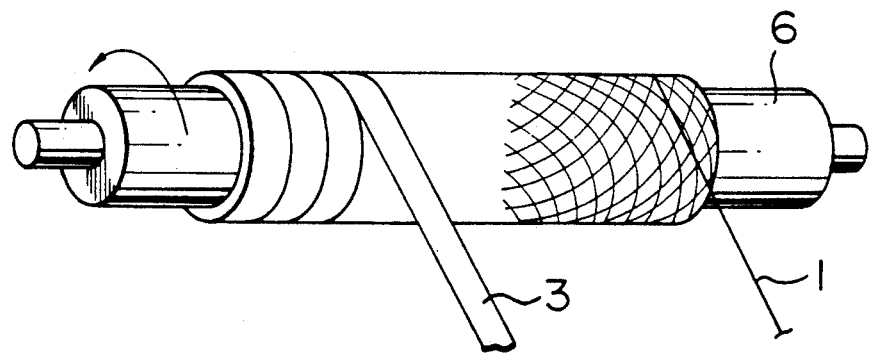
FIG. 1 is a perspective view showing the process for producing the preform of the present invention.

In the present invention, although the heat-meltable fiber layer may also be formed by winding a heat-meltable fiber filament, it is preferably formed by winding a tape-formed heat-meltable short fiber web on a reinforcing fiber layer formed by winding a continuous reinforcing fiber. The amount of the heat-meltable fiber to be used is most suitably in the range of 4-10% by weight relative to the amount of the continuous reinforcing fiber. When the content is less than 4% by weight, the form stability of the preform is lowered, whereas when the content exceeds 10% by weight, impregnation of resin may be impeded at the time of forming fiber reinforced plastics, resulting in lowering the strength of the formed articles, although the form stability of the preform is good.

The preform obtained according to the present invention may, besides being detached from the core and impregnated as it is with resin and subjected to pressure forming, be processed in various ways. For example, a cylindrically formed preform is heated as desired according to necessity to form a bent pipe-formed preform, from which a bent pipe-formed formed article can be obtained; or a cylindrical preform is crushed to form a plate-formed preform and the plate-formed preform can be singly, or appropriately arranged and laminated in an optional number of sheets and in desired directions, press-formed to obtain plate-formed formed articles.

The continuous reinforcing fibers used in the present invention may be those of glass fiber, carbon fiber, aramid fiber, etc. Since the reinforcing fiber is used in the form of continuous fiber, not only glass fiber but other high-strength, high-modulus multifilaments, such as those of carbon fiber and aramid fiber, can be used and hence fiber reinforced plastic of enhanced strength can be produced. In the case of glass fiber roving, those of 1000 to 1200 Tex may be used. Heat-meltable fiber used may be optionally selected from thermoplastic synthetic fibers of relatively low melting point, such as those of polyvinyl acetate, ethylene-vinyl acetate copolymer, polyamide, polyethylene and polypropylene. It is preferable to use a heat-meltable short fiber web in the form of non-woven fabric tape of about 10–100 g/m$^2$ formed of the above-mentioned thermoplastic synthetic fiber.

The heat-meltable short fiber web is used in optional proportions relative to the continuous reinforcing fiber depending on the shape and intended uses of the formed article. The heat-meltable fiber layer formed between the reinforcing fiber layers of the preform according to the invention can be effectively used in a limited amount which will not impair the high strength of the formed article, and also prevents the disturbance of fiber orientation at the time of detaching the preform from the core and in forming such as pressure forming.

In winding the continuous reinforcing fiber and the tape-formed heat-meltable short fiber web in layer, conventional equipment used in filament winding may be employed as it is. The winding layers, i.e. laminar winding, may be formed by winding, with simultaneous traversing, a desired amount of continuous reinforcing fiber at an optional angle round a rotating mandrel, then once cutting the continuous reinforcing fiber, subsequently winding, with simultaneous traversing, a desired amount of the short fiber web on the reinforcing fiber layer formed above, then cutting the web, and repeating the above procedures. Alternatively, they may be formed by winding, with simultaneous traversing, a desired amount of the continuous reinforcing fiber round a rotating mandrel, then once standing the fiber at a position outside the traversing area, subsequently winding, with simultaneous traversing, a desired amount of the short fiber web on the reinforcing fiber layer formed above, then once letting the web stand by outside the range of traverse, and thereafter piling up the reinforcing fiber layer and the short fiber web layer alternately in the same manner as above. The mandrel may have a cross section of not only a circle but also an ellipse, triangle, tetragon or optional other polygonal.

The time of heating subsequent to the laminar winding formation mentioned above varies depending on the kind of the tape-forming heat-meltable short fiber web used, but is usually about 2 hours in a hot-air oven at 130°–170° C., and cooling is usually effected by natural cooling, through which the tape-formed heat-meltable short fiber web melts and melt-bonds the reinforcing fiber layers with each other to form a preform. The heating time in the hot-air oven can be greatly reduced to about 30 minutes when a mandrel provided with a heating means is used. The detachment of the preform thus formed from the mandrel may be effected by pulling out the preform in the direction of the rotational axis of mandrel.

EXAMPLE

An embodiment of the present invention will be described below with reference to Drawings.

Figure 2:
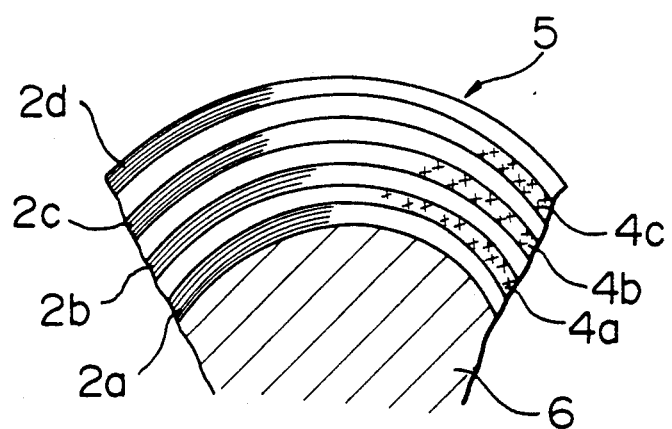
FIG. 2 is an enlarged partial sectional view of the preform of the present invention.
Figure 3:
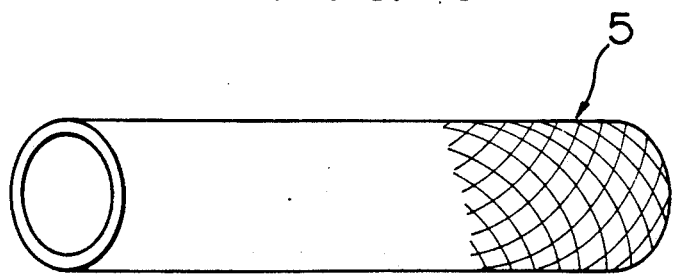
FIG. 3 is a perspective view of the preform of the present invention.

The preform shown in FIGS. 1 to 3 relates to a cylindrical preform 5 which comprises reinforcing fiber layers 2a, 2b, 2c and 2d formed of a continuous reinforcing fiber 1 continuous in circumferential direction and web layers 4a, 4b and 4c formed of a tape-formed heat-meltable short fiber web 3 continuous in circumferential direction, said layers being piled up alternately and in such a way that the innermost layer and the outermost layer are constituted of the reinforcing fiber layers 2a and 2d and the web layers 4a, 4b and 4c melt-bonding the upper and lower layers adjacent thereto with each other through their heat-melting ability. The cylindrical preform 5 may be produced by winding, with simultaneous traversing, the continuous reinforcing fiber 1 on a rotating mandrel 6 to form a reinforcing fiber layer 2a, winding thereon the tape-formed heat-meltable fiber web 3 and the continuous reinforcing fiber 1 alternately and plural times, forming the reinforcing fiber layer 2d as the outermost layer, and then heating the whole at the melting temperature of the short fiber web 3 to melt the web 3 and thereby to melt-bond the respective layers with each other, followed by cooling and solidification, and then detaching the laminar winding thus formed from the mandrel 6.

Although the Figures shown a preform wherein tape-formed heat-meltable fiber web layers are present between respective layers of 4 reinforcing fiber layers, it is needless to say that the number of piled-up layers is not restricted thereto.

The present invention will be described below with reference to Examples 1 to 3, Referential Example and, for comparison, Comparative Examples 1 and 2.

EXAMPLE 1

On the surface of a cylindrical rotating mandrel of 29 mm outside diameter was wound, with simultaneous traversing, a glass fiber roving of 1,100 Tex at an angle of 20° to the axial direction to form a reinforcing fiber layer. Then a tape-formed polyamide short fiber web of 55 mm width and 40 g/m$^2$ was wound one turn thereon to form a short fiber web layer. Further, the reinforcing fiber layers and the short fiber web layers were piled up alternately to form a laminar winding composed of 4 reinforcing fiber layers and 3 short fiber web layers.

The laminar winding thus obtained has a content of the short fiber web of 4.6% by weight relative to the amount of the continuous reinforcing fiber. The laminar winding was heated in a hot-air oven at 150° C. for 2 hours, then taken out and allowed to cool, and detached from the mandrel to obtain a cylindrical preform 29 mm in inside diameter, 34 mm in outside diameter and 1,000 mm in length.

The preform obtained above was heated at 150° C. for 30 minutes to loosen melt-bond and then crushed into the form of plate. The preform was then heated, while being impregnated with unsaturated polyester resin, at 30° C. for 10 minutes to be formed under pressure, then taken out and allowed to cool, whereby a plate 60 mm in width, 5 mm in thickness and 1,000 mm in length was obtained.

Table 1 shows the properties of the fiber reinforced plastic plate thus obtained. The preform obtained in the present Example shows a good resin impregnation property. The formed article prepared therefrom has a high fiber content of 72.5% by weight, has excellent bending strength and flexural modulus in longitudinal direction and is thus suited for use as a plate spring material.

EXAMPLE 2

A laminar winding was formed in exactly the same manner as in Example 1 except that the tape-formed polyamide short fiber web shown in Example 1 was wound two turns. The laminar winding obtained had a short fiber web content of 9.5% by weight relative to the amount of the continuous reinforcing fiber. The winding was heated in a hot-air oven at 150° C. for 2 hours, then taken out and allowed to cool, and detached from the mandrel to obtain a cylindrical preform 29 mm in inside diameter, 34 mm in outside diameter and 1,000 mm in length.

The preform obtained above was heated at 150° C. the form of plate. The preform was then heated, while being impregnated with unsaturated polyester resin, at 30° C. for 10 minutes to be formed under pressure, then taken out and allowed to cool, whereby a plate 60 mm in width, 5 mm in thickness and 1,000 mm in length was obtained.

The properties of the fiber reinforced plastic plate thus obtained are shown in Table 1.

EXAMPLE 3

Figure 4:
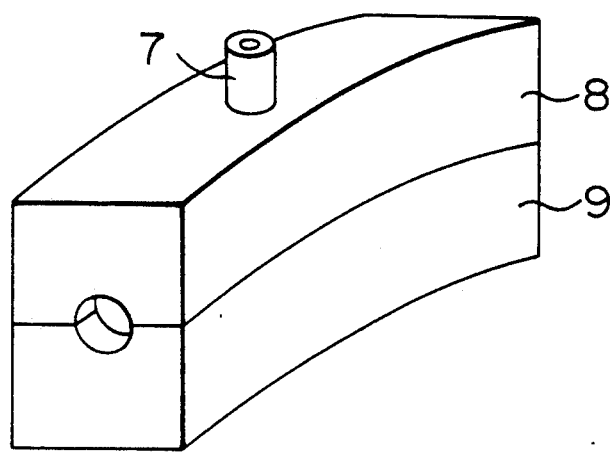
FIG. 4 is ,a perspective view showing a mold for forming a bent pipe-formed preform of the present invention.
Figure 5:
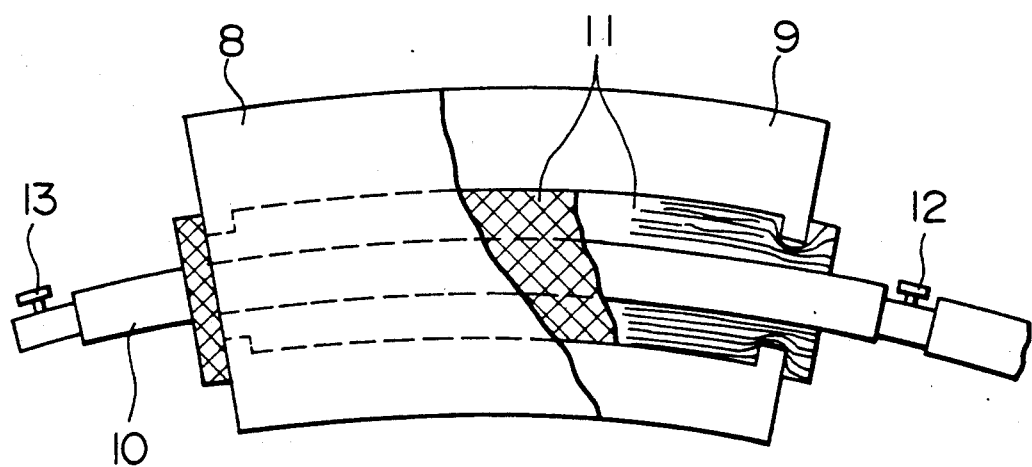
FIG. 5 is a partially cutaway view showing a state in which a preform is set in the mold of FIG. 4.

The straight cylindrical preform obtained in Example 1 was heated at 150° C. for 1 hour to effect solftening and loosening of melt-bond, and made into a bent pipe-formed preform. Between an upper mold 8 provided with a filling hole 7 and a lower mold 9 as shown in FIG. 4 were set a deflated rubber bag 10 to serve as a core and the bent pipe-formed preform material 11 as shown in FIG. 5, and the mold was clamped. Subsequently, air was pressed into the rubber bag through an air inlet valve 12, then unsaturated polyester resin was injected into the preform material 11 held between the mold and the rubber bag 10 and cured at room temperature for 30 minutes. Then the mold was removed, air in the rubber bag 10 was withdrawn through the air stop valve 13, and the rubber bag was removed from the formed article to obtain a bent pipe 29 mm in inside diameter, 35 mm in outside diameter and 1,000 mm in length. The results of bending test conducted with the product as it was in the form of the pipe showed values of a little over 3 times for both bending strenght and flexural modulus as compared with bent pipe molded article obtained by similar resin injection using a preform mat of the prior art.

REFERENTIAL EXAMPLE

A laminar winding was formed in exactly the same manner as in Example 1 except that the tape-formed polyamide short fiber web shown in Example 1 were wound 4 turns. The laminar winding obtained had a short fiber web content of 18% by weight relative to the amount of continuous reinforcing fiber. The winding was heated in a hot-air oven at 150° C. for 2 hours, then taken out and allowed to cool, and detached from the mandrel to obtain a cylindrical preform 29 mm in inside diameter, 34 mm in outside diameter and 1,000 mm in length.

The preform obtained above was heated at 150° C. for 30 minutes to loosen melt-bond and then crushed into the form of plate. The preform was then heated, while being impregnated with unsaturated polyester resin, at 30° C. for 10 minutes to be formed under pressure, then taken out and allowed to cool, whereby a plate 60 mm in width, 5 mm in thickness and 1,000 mm in length was obtained.

The properties of the fiber reinforced plastic plate thus obtained are shown in Table 1.

COMPARATIVE EXAMPLE 1

On the surface of a cylindrical rotating mandrel of 29 mm outside diameter was wound a glass fiber chopped strand mat of 450 g/m$^2$ to form a mat layer. Then a tape-formed polyamide fiber web of 110 mm width and 40 g/m$^2$ was wound thereon to form a web layer. A glass fiber roving cloth of 570 g/m$^2$ was wound further thereon to form a roving cloth layer. Then, further thereon, were formed a web layer, glass fiber mat layer, web layer, glass fiber roving cloth layer, web layer, and glass fiber mat layer to constitute a laminar winding.

The laminar winding obtained contained 6.5% by weight of the polyamide fiber web. The laminar winding was heated in a hot-air oven at 150° C. for 2 hours, then taken out and allowed to cool, and detached from the mandrel to obtain a cylindrical preform 29 mm in inside diameter, 34 mm in outside diameter and 1,000 mm in length.

The preform obtained above was heated at 150° C. for 30 minutes to loosen melt-bond and then crushed into the form of plate. The preform was then heated, while being impregnated with unsaturated polyester resin, at 30° C. for 10 minutes to be formed under pressure, then taken out and allowed to cool, whereby a plate 60 mm in width, 5 mm in thickness and 1,000 mm in length was obtained.

The properties of the fiber reinforced plastic plate thus obtained are shown in Table 1.

COMPARATIVE EXAMPLE 2

On a rotating mandrel having a plate-formed cross section was wound a glass fiber roving of 1,100 Tex while being impregnated with unsaturated polyester, and was then cured at room temperature to form a plate-formed fiber reinforced plastic 5 mm in thickness.

The properties of the fiber reinforced plastic obtained are shown in Table 1.

TABLE 1

| | Preform form stability | Resin impregnation property | Fiber content (wt %) | Bending strength (kg/mm²) | Flexural modulus (kg/mm²) |
|---|---|---|---|---|---|
| Example 1 | ○ | ○ | 72.5 | 74.8 | 2490 |
| Example 2 | ○ | ○ | 70.7 | 63.0 | 2210 |
| Referential Example | ○ | Δ | 68.7 | 45.3 | 1930 |
| Comparative Example 1 | ○ | ○ | 34.9 | 17.6 | 765 |
| Comparative Example 2 | — | — | 70.0 | 80.0 | 2500 |

Note:
The test methods are in accordance with JIS-K 6911.

As shown in Table 1, in Referential Example the amount of wound web is too large, resulting in deficient impregnation with resin and poor bending characteristics.

In Comparative Example 1 the fiber content of the formed article is low because conventional glass fiber chopped strand mat and glass fiber roving cloth are used therein. Resultantly, the bending characteristics are quite poor as compared not only with those in Examples 1 and 2 but also with those in Referential Example wherein resin impregnation is poor. In comparison of Comparative Example 2 with Examples 1 and 2, almost no difference in properties is recognized between the fiber reinforced plastic formed by conventional so-called filament winding and the fiber reinforced plastic prepared by using the preform of the present invention.

As described in detail above, the present invention relates to a preform which comprises an aligned reinforcing fiber layer and a heat-meltable short fiber web layer, said layers being piled up alternately in layers, the innermost layer and the outermost layer being constituted of the reinforcing fiber layer and the reinforcing layers being melt-bonded with each other through the heat-melting ability of the web layer, and to the process for producing the same. Accordingly, the preform obtained has an excellent form stability free from the occurrence of disorder of the fiber arrangement owing to melt-bonding caused by melting of the heatmeltable short fiber web, and can be formed into a straight cylindrical fiber reinforced plastic by impregnation with resin followed by curing. Further, the preform can be heated again to loosen melt-bond and then the cylindrical preform can be bent to form a bent pipe-formed preform, or it can be crushed to form a plate-formed preform, which can be used as the base material for forming reinforced plastics of various shapes. Resultantly, by impregnating the preform with resin followed by curing and forming, fiber reinforced plastic formed articles of various shapes having high strength and rigidity in the direction of arrangement of the continuous reinforcing fiber can be obtained without causing disorder of the arrangement of fiber.

As described above, the preform according to the present invention offers a high degree of freedom in form-designing as a structural material, so that it is suited for use in producing plastic formed articles of high strength and high rigidity employed for frames, plate springs, and other parts of automobiles, vehicles, etc.

What is claimed is:

1. A process for producing a preform for forming fiber reinforced plastics which comprises winding a continuous reinforcing fiber on a core to form a reinforcing fiber layer, winding on said layer a tape-formed heat-meltable fiber web at an amount of 4-10% by weight of the continuous reinforcing fiber to form a heat-meltable fiber layer, wherein the reinforcing fiber layer and the heat-meltable fiber layer are wound alternately in plural layers such that the reinforcing fiber layer is the outermost layer, then heat-melting the heat-meltable fiber, and after cooling detaching the laminated preform from the core.

2. A process for producing a preform according to claim 1 wherein the continuous reinforcing fiber is selected from the group consisting of glass fiber, carbon fiber and aramid fiber.

3. A process for producing a preform according to claim 1 wherein the heat-meltable fiber is the fiber of a polymer selected from the group consisting of polyvinyl acetate, ethylene-vinyl acetate copolymer, polyamide, polyethylene and polypropylene.

* * * * *